United States Patent
Paradie et al.

(10) Patent No.: US 6,664,918 B2
(45) Date of Patent: Dec. 16, 2003

(54) METHOD AND APPARATUS FOR IDENTIFYING COMPLEX OBJECTS BASED ON RANGE READINGS FROM MULTIPLE SENSORS

(75) Inventors: Michael John Paradie, Nashua, NH (US); Bruce David Labitt, Nashua, NH (US)

(73) Assignee: MIA-Com, Inc., Middletown, PA (US)

( * ) Notice: Subject to any disclaimer, the term of this patent is extended or adjusted under 35 U.S.C. 154(b) by 0 days.

(21) Appl. No.: 10/042,902

(22) Filed: Jan. 9, 2002

(65) Prior Publication Data

US 2003/0128153 A1 Jul. 10, 2003

(51) Int. Cl.[7] ............................................. G01S 13/06
(52) U.S. Cl. ...................... 342/70; 342/118; 342/126; 342/145; 342/146
(58) Field of Search ........................... 342/70–72, 118, 342/145–146, 126, 189, 191, 435–436

(56) References Cited

U.S. PATENT DOCUMENTS

| | | | | |
|---|---|---|---|---|
| 5,138,322 | A | | 8/1992 | Nuttall ........................ 342/126 |
| 5,369,409 | A | * | 11/1994 | Urabe et al. ................. 342/128 |
| 5,392,225 | A | | 2/1995 | Ward ........................... 342/189 |
| 5,926,117 | A | * | 7/1999 | Gunji et al. .................. 340/988 |
| 5,936,549 | A | | 8/1999 | Tsuchiya ..................... 340/903 |
| 6,055,042 | A | * | 4/2000 | Sarangapani ................ 180/167 |
| 6,163,252 | A | * | 12/2000 | Nishiwaki ................... 340/435 |
| 6,289,282 | B1 | | 9/2001 | Hassler et al. .............. 701/301 |
| 6,380,885 | B2 | * | 4/2002 | Shirai et al. ................. 342/118 |
| 6,396,435 | B1 | * | 5/2002 | Fleischhauer et al. ...... 342/126 |
| 6,466,157 | B1 | * | 10/2002 | Bjornholt et al. ............ 342/28 |

FOREIGN PATENT DOCUMENTS

| | | | |
|---|---|---|---|
| DE | 40 23 538 A1 | 1/1992 | ........... G01S/15/93 |
| DE | 199 49 409 A1 | 4/2001 | ........... G01V/9/00 |
| DE | 199 07 465 A1 | 7/2001 | ........... G01V/3/12 |

OTHER PUBLICATIONS

Martin Döring, *Optimierung von Trackingalgorithmen für Detektion von Objekten mit einem Nahbereichs–Pulsradarsystem*, Dec. 22, 1998.

Press et al., *Numerical Recipes in C*, Cambridge University Press, 683–685 (1999).

\* cited by examiner

*Primary Examiner*—Thomas H. Tarcza
*Assistant Examiner*—Isam Alsomiri

(57) ABSTRACT

The invention is a method and apparatus for determining the shape and location of objects by trilateration based on the output of a plurality of range sensors. The range measurements from a plurality of sensors are correlated with each other to identify one or more potential objects. With respect to each potential object, it is assumed that the object can be one of a finite number of possible predefined shapes. For each potential object, a metric is calculated for each of the predefined shapes using the set of range measurements upon which the potential object is based defining the likelihood that the set of readings correspond to an actual object of that predefined shape. Each potential object is then assumed to have the predefined shape that yielded the lowest metric (i.e., that yielded the metric that indicates the highest likelihood that the object has the corresponding shape). The list of potential objects is then ordered according by their calculated metrics from lowest to highest. The ordered list is then pared down to a smaller list of actual objects by selecting the potential object highest on the ordered list and assuming that it is an actual object and then removing from the list all other lower-ordered potential objects that are based on any of the individual measurements upon which the selected object is based and repeating this process until all potential objects on the list have either been selected as an actual object or removed from the list.

37 Claims, 6 Drawing Sheets

METHOD AND APPARATUS FOR IDENTIFYING COMPLEX OBJECTS BASED ON RANGE READINGS FROM MULTIPLE SENSORS

FIELD OF THE INVENTION

The invention relates to the determination of the shapes and locations of complex objects based on range measurements from multiple sensors. More particularly, the invention relates to determining by trilateration the shapes and locations of multiple complex objects detected by multiple, spaced range sensors.

BACKGROUND OF THE INVENTION

Trilateration is the art of determining the location of an object in space based on knowledge of the range (distance) of the object from multiple known locations. For instance, for simplicity, let us assume an idealized point object, i.e., an object that is infinitely small. Knowledge of the range of the object from a known location (e.g., one particular sensor) defines a sphere on which the object must lie, that sphere being the sphere that is centered at the sensor and has a radius equal to the measured range value. A range value from two separate locations (sensors) defines two distinct spheres on which the object must lie. Accordingly, the object must lie on the locus of points defined by the intersection of the two spheres, which is a circle. If the range from a third location (or sensor) to the object is known, then the object is known to lie on the locus of points defined by the intersection of all three spheres. For many practical scenarios, the intersection of these three spheres defines a single point which locates the object.

As another example, in a two dimensional environment (or at least an environment that can be assumed to be two dimensional), range readings from only two sensors to the same idealized point object will define two circles that overlap at two points. For many practical scenarios, however, only one of these intersections will be located in the detection areas of the sensors, thus locating the point object.

Of course, real world objects are not points, but are complex, having size and shape. Thus, real objects do not have a single well-defined location. Often, however, the measured range is the range to a point on the object. The particular point on the object that results in a reading at the sensor can depend on several factors, most particularly, the shape of the object and the orientation of the object with respect to the observing sensor. The particular point on an object that renders the range determined by the sensor often is the point on the object which presents a surface perpendicular to the beam propagation.

One example of a system that provides a range measurement, but no bearing measurement is a broad azimuth radar reflection system. As is well known in the related arts, one can send out a radio frequency (RF) beam from a known location and then receive reflections of that beam at the same known location and detect the time delay between the time the beam was issued and its reflection back to the sensor. Assuming that the detection point is approximately the same as the origination point of the beam, the delay period can be converted to a round-trip distance by multiplying it by the speed of the beam. The round trip distance can be divided by two to obtain the range to the object.

Of course, if the radar beam has a defined azimuth, the radar detection system also provides at least some bearing information. Air traffic radar is a well known example of a radar that provides both range and bearing information. Such radars send out very narrow azimuth beams from a rotating transmitter antenna. Therefore, range can be determined from the delay of the reflected beam, while at least some bearing information can be determined from the angular orientation of the antenna at the time of the receipt of the reflected beam.

In actuality, virtually all radar systems give some bearing information because the transmitters rarely generate totally spherical wave fronts with a full 360° azimuth. For instance, even a radar with an azimuth as wide as 180° eliminates half of the bearing spectrum (assuming one knows the direction in which the sensor is pointing).

In theory, when there is a single, point object in the field of view, trilateration is mathematically simple. However, real objects are not point objects. For instance, three sensors detecting the same object may detect slightly different surfaces of the object, wherein each surface is, essentially by definition, at a different location. Further, each sensor has some error range and thus each sensor reading will be inaccurate by some amount. Accordingly, in a real world situation, the three circles defined by the range readings of each sensor of a single object may not, in fact, intersect at a single point. Rather, there may be three closely spaced intersection points of two circles each, i.e., first and second circles, first and third circles, and second and third circles. Accordingly, various algorithms have been developed for estimating an exact location based on such readings.

In many real world uses of trilateration that assume a point object, if the objects are substantially farther away from the sensors than the sensors are from each other, the fact that each sensor might receive a reflection from a different point on the object is not problematic. However, when an object is close to the sensors, a point-object assumption can lead to significant errors in the determination of the location of an object or even the recognition that an object exists. For instance, FIG. 1A illustrates range measurements 13, 15 by two sensors 12, 14 to an ideal point object 16 located very close to the sensors in an environment that can be assumed to be two dimensional, while FIG. 1B illustrates range measurements by the same two sensors 12, 14 to an ideal line object 18 (commonly called a plate object) located very close to the sensors. If the detection algorithm assumes a point object, it can easily misinterpret the telemetry. For instance, the range circles 20, 22 from the two sensors 12, 14 do not intersect and thus an algorithm that assumes a point object would not detect the plate object 18.

On the other hand, if the algorithm that interpreted the range measurements assumed that the object was a plate object, it could accurately detect plate object 18, but would misinterpret the telemetry from the point object 16 in FIG. 1A as being a plate object represented by dashed line 24 in FIG. 1A.

If some information is known about the shape of an object in the field of view of a sensor array, it can be used to better determine the location or even the shape of the object. For example, if it is known that a sensor array is in an environment that can be assumed to be two dimensional and that consists entirely of plate objects, then the location and orientation of an object can be determined from only two sensor readings. Specifically, if the object can be assumed to be a plate, then the distance and orientation of the line is given by the line that is tangential to both range circles, as illustrated by line 18 in FIG. 1B. Assuming that the azimuth of the sensors is 180° or less, as assumed in all Figures herein (and that they are pointing generally in the same direction and that direction is approximately perpendicular to a line drawn between the two sensors), there is likely only one line that will meet that criterion. Further, while the width of the plate object would not be known exactly, it would be known to be at least as wide as the distance between the two points 26 and 28 where the line is tangent to the two circles, respectively. This trilateration technique can be extended into three dimensions by adding a third sensor range reading.

Regardless of what assumptions can be made about the environment, matters can be become extremely complicated if there is potentially more than one object in the field of view of a sensor array. In many real world applications, there may be more than one object in the field of view such that each sensor receives a plurality of reflected wave fronts and, therefore, a plurality of range readings. Merely as an example, let us consider a highly simplified example in which four sensors each detect ten reflected wave fronts from the same ten actual objects. In this highly simplified example, as many as 10×10×10×10=10,000 "potential objects" can theoretically be identified by correlating the range circles from each sensor with the range circles of each other sensor. For example, let us assume that all objects are point objects. Then we can consider objects to potentially exist only where each of the four sensors has a range reading that defines a circle (or a sphere if a three dimensional system) that intersects at least one range circle from all three other sensors. It is likely that not all range readings (circles) of each sensor will intersect with the range readings of all three other sensors and, accordingly, with this assumption, it is likely that the number of potential objects will be substantially less than 10,000. However, the number of potential objects still could number in the hundreds in a realistic environment, even though there are only ten actual objects in the field of view.

Accordingly, an algorithm usually must be employed that attempts to pare down a large list of "potential objects" to an accurate smaller list of actual objects.

In sensor arrays that operate in environments with multiple objects in the field of view that can be of different shapes and that can be close to the sensor array, generating an accurate map of the environment can be extremely difficult.

Accordingly, it is an object of the present invention to provide an improved multi object location sensor method and apparatus.

It is another object of the present invention to provide a method and apparatus for determining the shape of objects using trilateration.

SUMMARY OF THE INVENTION

The invention is a method and apparatus for determining the shape and location of objects by trilateration based on the output of a plurality of range sensors. In accordance with the method and apparatus, the range measurements from a plurality of sensors are correlated with each other to identify one or more potential objects. With respect to each potential object, it is assumed that the object can be one of a finite number of possible predefined shapes. For each potential object, a metric is calculated for each of the predefined shapes using the set of range measurements upon which the potential object is based, the metric defining the likelihood that the readings correspond to an actual object of that predefined shape. Each potential object is then assumed to have the predefined shape that yielded the lowest metric (i.e., that yielded the metric that indicates the highest likelihood that the object has the corresponding shape).

In accordance with another aspect of the invention, once all of the potential objects in the field of the sensor array have been identified (and their shapes determined in accordance with the description above), the list of potential objects is pared down to a list of actual objects by ordering the list according by the calculated metrics (i.e., using the metric corresponding to the shape that the object was determined to have), with the potential object with the lowest metric at the top of the list and the potential object with the highest metric at the bottom of the list. The ordered list of potential objects is then pared down to a smaller list of actual objects by selecting the potential objects highest on the ordered list and assuming that it is an actual object and then removing from the list all other lower-ordered potential objects that are based on any of the individual measurements upon which the selected object is based. This process is then repeated for the next highest potential object remaining on the list until all potential objects on the list have either been selected as an actual object or removed from the list.

DETAILED DESCRIPTION OF THE INVENTION

This specification describes an improved method and apparatus for determining the size, shape and/or location of objects using trilateration techniques in a complex environment, i.e., an environment in which objects can have different shapes and sizes and in which there may be multiple objects in the field of view of the sensor array.

Trilateration techniques, and particularly trilateration techniques in accordance with the present invention, can be used in many different applications and environments. However, the invention will be described hereinbelow in connection with automotive use. It should be understood by those of skill in the art that this is not a limitation of the invention and is merely an exemplary embodiment. The invention will particularly be described in connection with an embodiment for detecting obstacles in front of a moving car. Such a system might be used in connection with an intelligent stop & go system in which a map of obstacles or objects in front of the car is generated and used to control the speed of a car such as, for instance, matching the speed of a vehicle directly in front of the car when operating in a traffic jam environment. The discussion in the background section of this specification focused on the determination of the location of objects at a given instant in time from the sensor readings. However, in an application such as the aforementioned intelligent stop & go system, the track (i.e., direction and velocity) of the detected objects also is determined. In such a system, a multiplicity of temporally displaced sets of readings are taken, each set used to generate a static map of the locations of the objects in the field of view. Then the multiplicity of maps are correlated with one another in order to determine the tracks (velocity and direction) of the objects.

Figure 2:
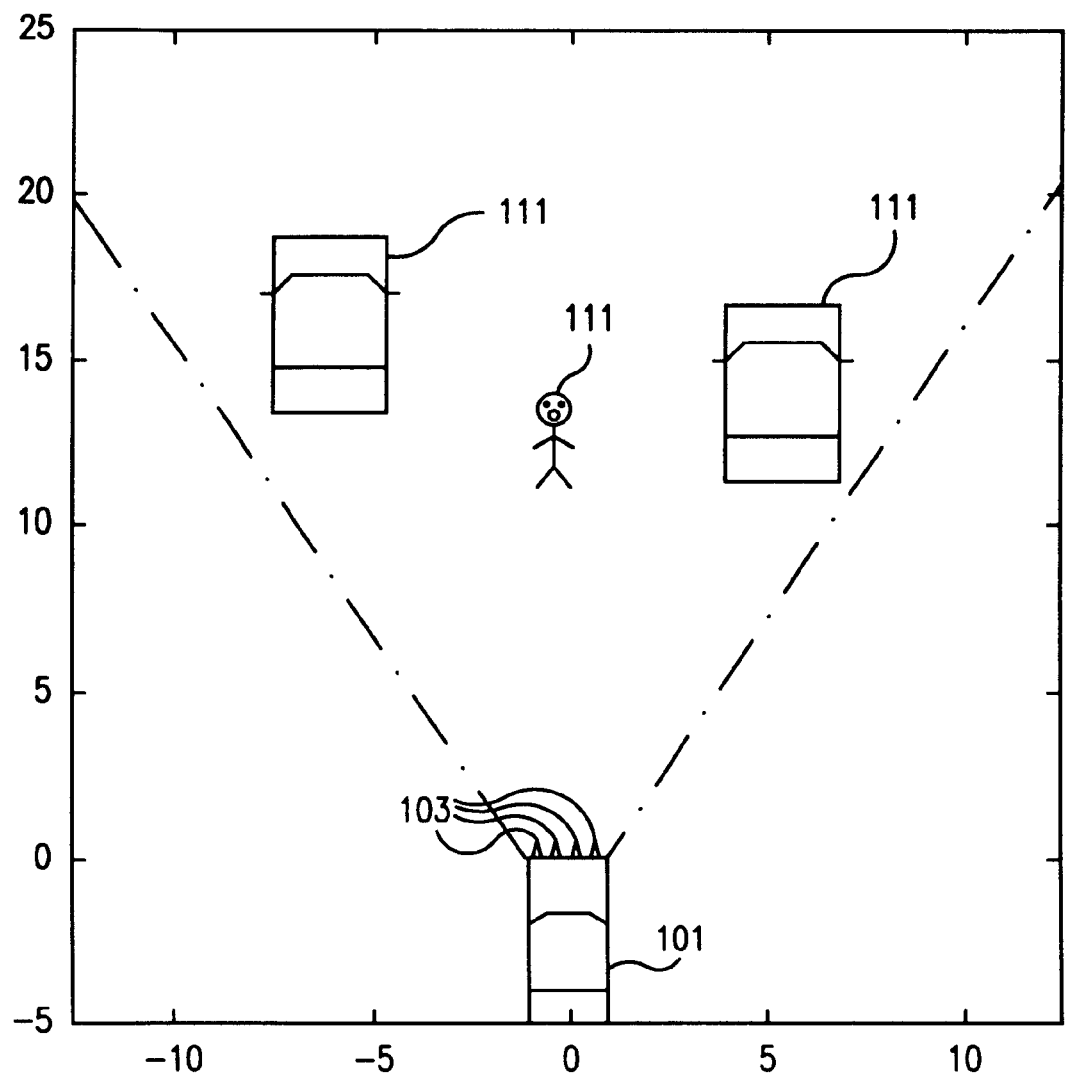
FIG. 2 is a plan view of an exemplary application of the present invention.

FIG. 2 is a plan view of an exemplary application of the present invention. In this exemplary application, four radar sensors 103 are positioned in a line in the front end of an automobile 101. The radar sensors may be pulsed or variable frequency sensors so that they can detect and distinguish multiple reflected wave fronts in order to provide range measurements to multiple objects 111.

In at least one preferred embodiment of the invention, each sensor is a short range 24 GHz pulse radar, such as Model MLAU0003-006, manufactured by M/A-COM of Lowell, Mass.

In at least one embodiment, each sensor emits a very short radio frequency (RF) pulse and then detects reflections of that pulse back to the sensor. The sensor determines the delay between the issuance of the pulse and the reflected wave fronts and calculates the distances to the objects. The range of the sensors should be limited to some reasonable distance based on the application. This can be done by discarding any reflected wave fronts below a predetermined magnitude and/or received after a predetermined delay. Alternately or in addition, the number of range measurements can be limited to a particular number, e.g., the ten closest objects (reflected wave fronts). Further, in an automotive application it is often reasonable to assume a two dimensional environment without substantial loss of necessary information. While theoretically as few as two sensors may be used in two dimensional trilateration, it is generally necessary to include more than two sensors. For instance, when the objects may be complex shaped objects, it is quite possible that one or more sensors may not detect a reflection off of an object that is within the desired field of view. Further, the use of more than two sensors helps eliminate situations where readings from two different sensors can only reduce the location of the potential location of the object to two possible locations rather than one.

The use of more than two sensors also provides part of a means to determine the shape and/or size of objects in accordance with a preferred embodiment of the present invention. It has been found that, in the automotive field, four sensors arranged in a line in the bumper of an automobile provide good performance.

Figure 3:
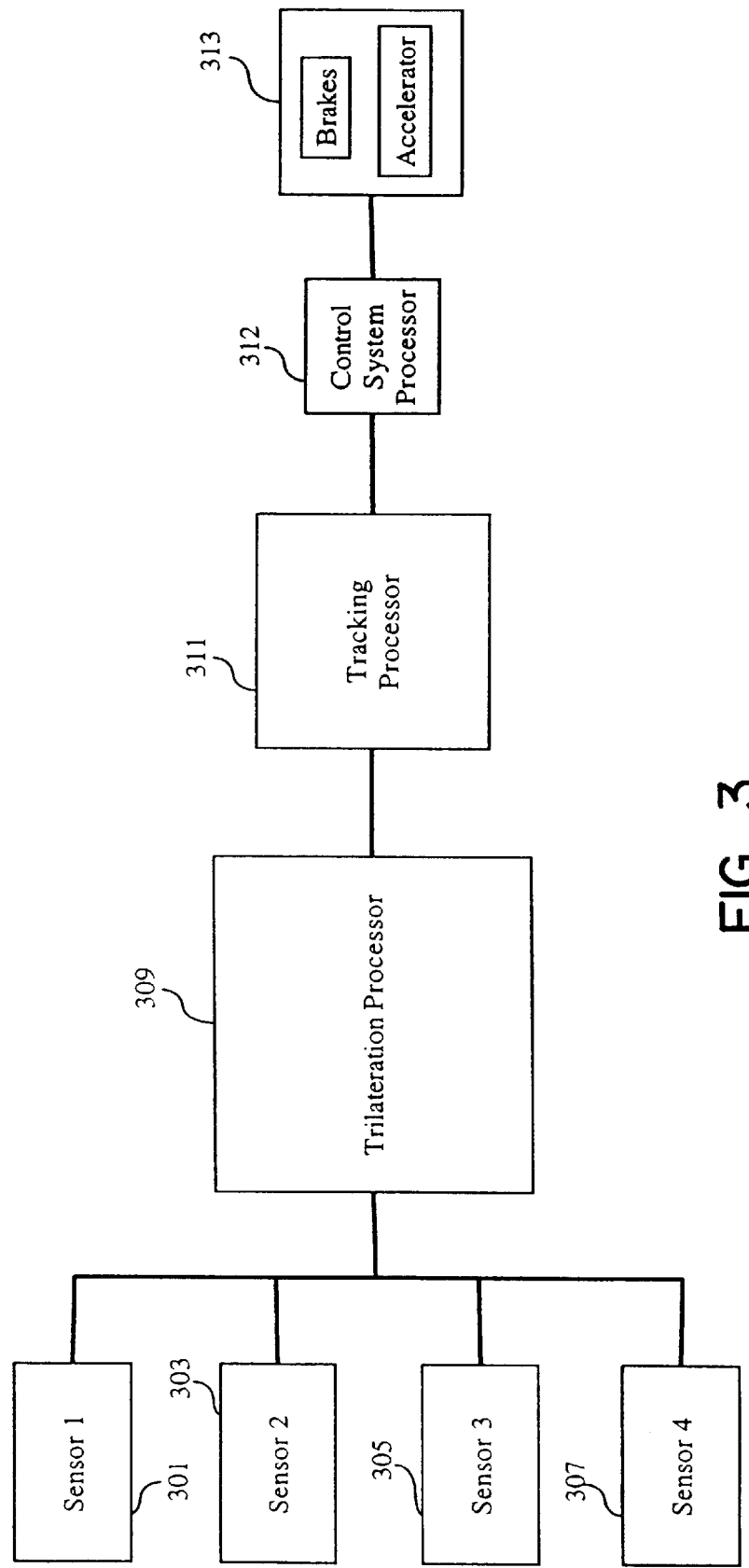
FIG. 3 is a block diagram of an intelligent vehicle control system in accordance with the present invention.

FIG. 3 is a block diagram of an intelligent vehicle control system in accordance with the present invention. It comprises four range sensors 301, 303, 305, and 307 and a digital processor 309 coupled to receive the sensors' range measurement outputs. The digital processor 309 takes those measurements, and runs them through an algorithm to create a map of objects in the field of view of the sensors. In a practical stop & go system, the processor 309 will continuously generate new maps at spaced time intervals and output the maps to a tracking processor 311 that compares each map to previous maps to track the velocity and direction of the objects. Tracking processor 311 then feeds that data to a control processor 312 that generates signals for controlling other components 313 of the automobile, such as the brakes and accelerator, in order to implement the aforementioned stop & go vehicle control system.

In the above-described stop & go vehicle control system, it has been found that in virtually all practical environments, it is not necessary to know the exact shape or size of objects. Accordingly, it is quite safe for the trilateration algorithm to consider a person or a pole to be a point object. In fact, it has been found that it is not particularly crucial to even determine the shape or size of any object that is more than several meters away from the vehicle (i.e., from the sensor array) in order to follow traffic without hitting any obstacles. However, if an object is very close to the sensor array, e.g., less than several meters, it does become important to develop more specific information about the size and/or shape of the object in order to effectively control the vehicle and avoid hitting objects. Even at close ranges, small objects, such as small-diameter poles, can safely be assumed to be point objects. However, at close ranges, it may be necessary to be distinguish between relatively small objects such as poles and large, plate-like objects such as walls and sides of trucks.

The present invention provides a method and apparatus for determining at least the general nature of objects using one or more reasonably safe assumptions about objects in the environment.

There are many pieces of information about an object that, if known in advance (so that certain assumptions can be made in processing the range measurements), may be used in a trilateration algorithm to help define the shape, location or existence of an object in the field of view of a sensor array. For instance, if it is known that a sensor array is in an environment in which all objects are circles of a given diameter, then one of skill in this art will readily understand that readings from only two sensors are sufficient to define the location of a circle. Again, we have assumed a two dimensional environment for ease of discussion, but those of skill in this art will readily recognize that these concepts are easily extendible to three dimensions.

Figure 1A:
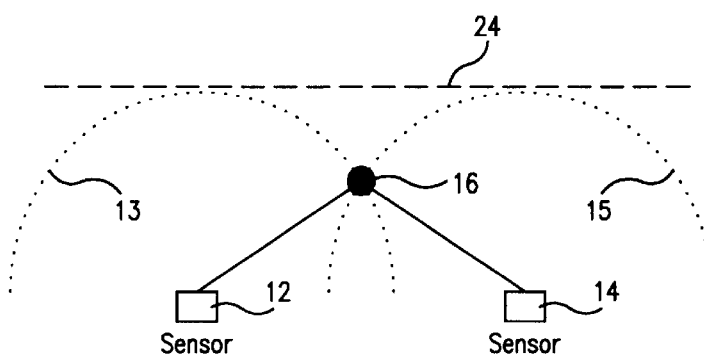
FIG. 1A is a range circle diagram illustrating detection of a point object by a range sensor array comprising two sensors.
Figure 1B:
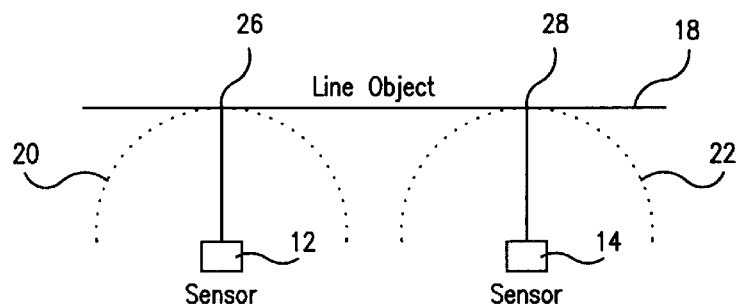
FIG. 1B is a range circle diagram illustrating detection of a plate object by a range sensor array comprising two sensors.
Figure 1C:
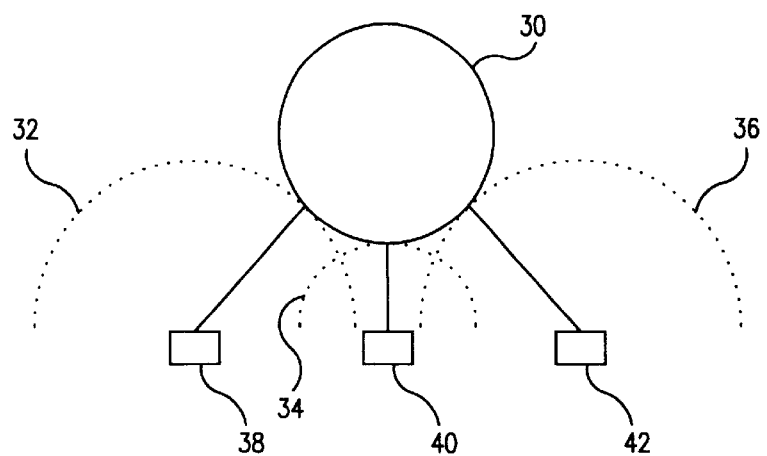
FIG. 1C is a range circle diagram illustrating detection of a circular object by a range sensor array comprising two sensors.

Even further, if one knows only that all objects in the field of view are circles, but the circles could be of different diameters, then readings from three sensors provide sufficient information to define the location and diameter of the circle. Specifically, referring to FIG. 1C, the circle object 30 detected by the range circles 32, 34, 36 of three sensors 38, 40, 42, respectively, is defined by the circle that is tangent to all three range circles. Note that the radius and position of the circle is known. (Again, depending on the breadth of the field of view of the sensor array and/or the positions of the sensors to each other, there may be more than one circle that meets this criterion. However, these potential ambiguities usually can be easily eliminated by placing the sensors in a particular orientation to each other, e.g., a line, and/or limiting the sensors' azimuths.

Using the assumption that all objects are circles of some radius, very small objects, such as small diameter poles and plate-like objects, such as walls, can be considered as extreme examples of circles. Specifically, plate-like objects can be considered circles of infinite radius and point like objects can be considered circles of infinitesimal (i.e., zero) radius.

It has been determined that the decisions that need to be made in order to control the vehicle to keep it from hitting any obstacles and to follow a vehicle ahead of it can be made safely by assuming that all objects are circle objects. Even further, as noted above, when an object is more than several meters away from the sensor array, it is not important even to determine its shape at all.

Accordingly, an effective trilateration system can be implemented for a stop & go vehicle control system using the assumption that any object more than several meters away from the vehicle is a point object and assuming all objects closer than several meters from the vehicle is a circle and determining the size (i.e., radius) of those objects. A distance of six meters has been found to be an effective threshold for assuming all objects are point objects. This reduces the amount of processing power needed to generate the object maps. Further, the assumption that objects beyond a certain distance from the sensors are point objects is significant because of the fact that a minimum of three sensor readings are necessary to identify the radius and location of a circle, whereas a minimum of only two sensor readings are necessary to determine the location of a point. The ability to rely on fewer sensor readings is significant because it is possible for some sensors to miss some objects. There are many potential reasons that a sensor may miss an object. For instance, there may be substantial interference in the environment. Alternately, the object may have poor reflectivity in the direction of the sensor. Accordingly, decreasing the minimum number of sensors that must receive a reflection from an object in order for the trilateration algorithm to identify the object inherently increases performance.

Furthermore, it is more likely that an object that is farther away from the sensor array might be missed by one or more sensors than an object that is close to the sensor array. Accordingly, if the trilateration algorithm assumes that all objects over a certain distance from the sensors are point objects, then that algorithm would achieve almost all of the benefit of reducing the number of sensors necessary to identify an object regardless of how it processes closer objects.

While the discussion above concentrated on reducing the processing power and/or number of sensors necessary to perform trilateration in accordance with the invention, if one were willing to increase processing requirements and/or the number of sensors in the array, the invention also can be extended in the opposite direction to determine even more information about the objects in the field of view. For instance, a trilateration technique can be developed in accordance with the present invention assuming that all objects are ellipses. If one makes the broader assumption that all objects are ellipses (a circle is merely one type of ellipse), then a minimum of four sensor readings are necessary to define an object. However, trilateration in accordance with the present invention can be used to more accurately determine the shape and location of objects.

In actuality, it has been found that even further assumptions that substantially simplify processing can be made without significant loss of information necessary to avoid hitting obstacles and to follow another vehicle in traffic in a stop & go vehicle control system. Particularly, it has been determined that one may assume that each object is either a point object or a plate object. Alternately stated, it may be assumed that all objects are either circles of infinitesimal radius or circles of infinite radius. In accordance with the discussion above, more preferably, the algorithm assumes that all objects less than a predetermined distance from the sensor array are either point objects or plate objects and assumes that all objects greater than that predetermined distance are point objects.

The assumption that an object is either a point object or a plate object has significant advantages. Particularly, with the use of minimal additional processing, as explained further below, it is possible to again reduce the minimum number of sensor readings needed to define the position of an object to two sensors.

Specifically, for every set of sensor readings that corresponds to a potential object, an algorithm can calculate the location of the object twice using two different assumptions. Specifically, first it will assume that the object is a point and calculate its location and then it will assume it is a plate and calculate its location. As noted above, if one assumes that an object is a point object, then its location is defined by the intersection of the range circles of the two or more sensors that detected it. Alternately, if an object is a plate object, then its location is defined by the line that is tangent to the two or more range circles upon which the potential object is based. Then, for each of the two assumptions, the algorithm calculates a metric indicative of the likelihood that the prediction (point or line) is accurate and selects the assumption (point or plate) that yielded the lowest metric (i.e., the highest likelihood that the prediction is accurate).

Figure 4:
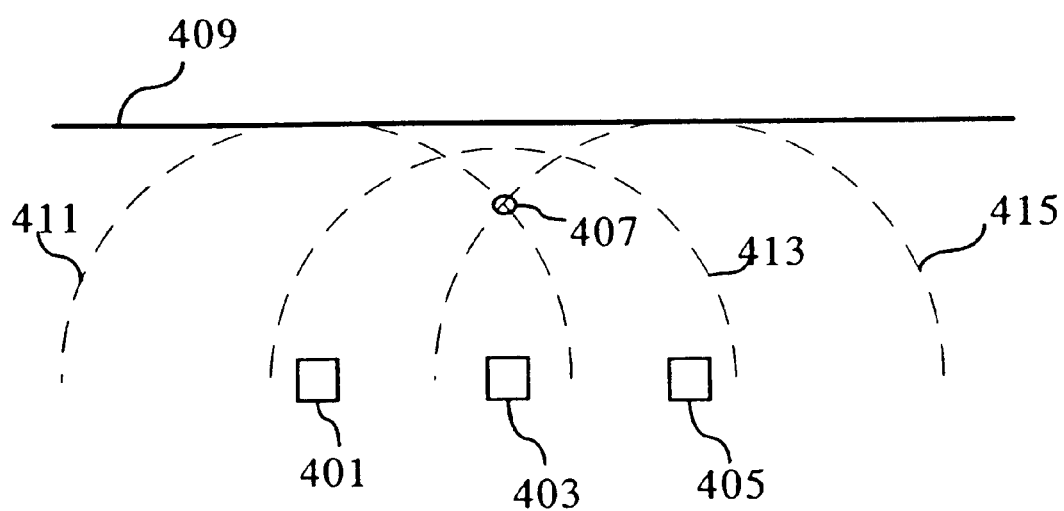
FIG. 4 is a plan view of a sensor array in an environment containing a wall.

The metric can be calculated in any reasonable manner. For instance, in a preferred embodiment of the invention, a potential object is identified only when range measurements from three or all four of the sensors generate a range reading that could correspond to the same object. Then, it is first assumed that the object is a point object. The presumed location of the point object is then calculated by taking the two measurements from those two of the three or four sensors upon which the object is based that are most distant from each other and calculating the location of the point object as the intersection as those two range circles. For instance, referring to FIG. 4, let us assume a potential point object is identified based on three sensor readings 411, 413, 415 from sensors 401, 403, 405, respectively. First, assuming that it is a point object, its location is determined as the point of intersection 407 of the range circles of 411, 415 of the two outermost sensors 401, 405.

Next, the metric is calculated using the reading or readings of the other sensor, e.g., circle 413 of sensor 403, upon which the object is based. The metric can be calculated using the well known sum of the squares of the errors (SSE) technique. Particularly, the range of the inner sensors to the presumed location of the point object is calculated and then the difference between that range and the actual range measurement from that sensor upon which the object is based is determined. Each of those error values is squared and those squares of the errors are summed together to arrive at the metric. In the simple example illustrated by FIG. 4, there is only one inner sensor and, therefore, no summing step would be necessary. The same process is then performed with respect to the presumed location of the object when it is assumed that the object is a plate. More particularly, the location of the plate is determined as the line that is tangent to the corresponding range circles 411, 415 from the two outermost sensors 401 and 405. This is line 409 in FIG. 4. Then the difference between the range of the inner sensor 403 to line 409 and the actual range measurement from that sensor upon which the object is based (as dictated by range circle 413) is determined. Each error is squared, and the squared errors, if more than one, are summed together.

Next, the metric calculated using the assumption that the object is a point object is compared to the metric that was calculated assuming that the object was a plate object. The object type (point or plate) that has the lowest metric is assumed to be the correct object type. This process is performed for every object detected or, preferably, only for every potential object that is within a predefined distance of the sensor array, and all potential objects further beyond the predefined distance are assumed to be point objects.

With respect to potential objects that are determined to be plate objects, the actual width of the plate object is not fully determined. However, it is known that the plate extends at least between the tangent points of the range circles of the two outermost sensors that generated range circles upon which the potential object is based. For instance, referring to FIG. 1B, the plate object extends at least from point 26 to point 28. In a preferred embodiment of the invention, the plate is assumed to have a length equal to the distance between these two points.

In a preferred embodiment wherein the metric is divided by the variance of the range measurements, the metric can be considered to be the sum of one or two random variables, each having zero mean and unity variance. If it is assumed that each variable is also normal and independent, then the metric has a chi-square distribution. Specifically, a three sensor metric has a chi-square distribution with one degree of freedom (from its one inner sensor) whereas a four sensor metric has two degrees of freedom.

It is advantageous for the metric of both three and four sensor potential objects to have the same statistical distribution. This would permit these objects to be compared directly to each other using the metric, without bias favoring either kind. To accomplish this, the metric of three sensor objects is mapped to the equivalent chi-square value having two degrees of freedom. The mapping function can be implemented by a polynomial approximation.

The above described methods for calculating the location of the potential point and plate objects and for calculating the metric are merely exemplary. Many other ways of calculating locations and metrics are known and can be used.

For example, the specific location that is determined for each potential object is a non-linear problem that can be solved using an iterative least-squares method, such as the Levenberg-Marquardt method. See, for example, William Press et al, "Numerical Recipes in C", Cambridge University Press, 1999. Thus, for instance, one can calculate a presumed location of the object using all of the range measurements upon which that object is based (rather than just the measurements from the two outermost sensors) and then calculate an error metric that is based on all of the range measurements upon which the object is based (rather than just the measurements from the one or two inner sensors). That metric may be calculated using an SSE technique or another technique.

A Monte-Carlo simulation indicates that the much simpler outermost sensor method first discussed above produces location results the accuracy of which are within about ten percent of the much more complex iterative Levenberg Marquardt algorithm.

It should be noted that the criteria for a set of range readings from different sensors to be considered to correspond to a potential object generally will be different if one assumes that the object is a point object versus if one assumes that the object is a plate object. For instance, referring to FIG. 1B, if one assumes that all objects are point objects, then the two range readings illustrated in FIG. 1B corresponding to the single plate object 18 would not be considered to correspond to a point object and a potential object would not be added to the list because the two range circles do not intersect. However, if the assumption is that all objects are plate objects, those two readings would be grouped together as being the basis of a potential plate object. Accordingly, the criteria for a set of readings from different sensors to be grouped together to form the basis for a potential object to be added to the list of potential objects should be broadened to include all objects that can be plates as well as all objects that can be points.

Figure 5:
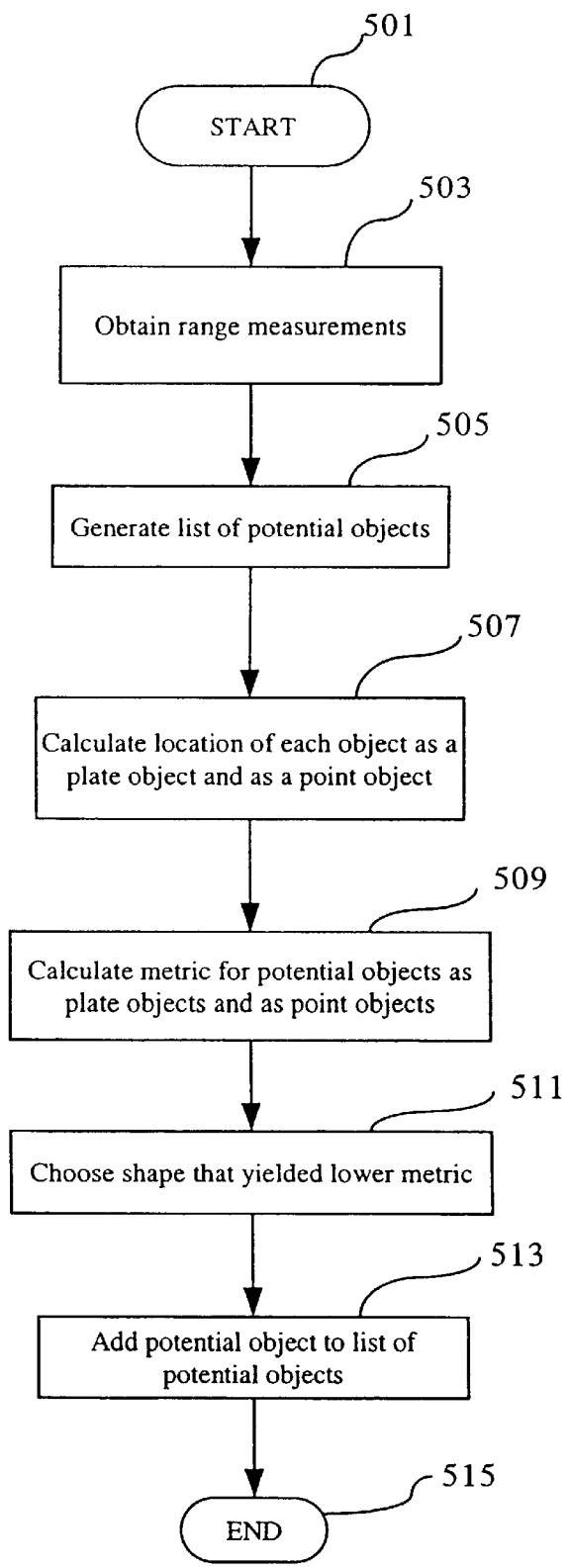
FIG. 5 is a flow diagram of a trilateration technique for determining the shape of an object in accordance with one embodiment of the present invention.

FIG. 5 is a process flow diagram illustrating the steps in accordance with a preferred embodiment of the invention. The process starts at step 501. In step 503, the range measurements are obtained from the four range sensors. In step 505, the processor generates a list of potential objects based on the range measurements. As discussed above, the criteria for a plurality of range measurements to be grouped into a set corresponding to a potential object based on trilateration techniques can be based on various criteria. In a preferred embodiment, the criteria should be broad enough to include objects that would qualify for the list either as a potential plate object or as a potential point object or both. Also, in a preferred embodiment of the invention, a potential object must be based on readings from at least three of the four sensors, even though two sensor measurements are theoretically adequate to define either a plate object or a point object. In step 507, two locations are calculated for the potential objects, the first calculation being based on the assumption that the object is a plate object and the second location being based on the assumption that the object is a point object. If the plurality of range measurement does not qualify as a particular object type (point or plate), then the calculation of the object location for that particular object type is not performed.

In step 509, two error metrics are calculated for each potential object, one for the potential object as a plate object and the other for the object as a point object. In step 511, the process assumes that the object is of the shape (plate or point) that yielded the lower error value. In step 513, the potential object is added to the list, including the object's shape (point or plate) and location.

In the case of a point object, the location essentially defines the point. In the case of a plate object, the location information is given by the two tangent points that define the line and, as noted above, in a preferred embodiment of the invention, the plate is at least as wide as the distance between the two points. In a preferred embodiment of the invention, we assume that the object is equal in width to the distance between the two points. The process ends at step 515.

As noted above, the criteria that typically would be necessary for identifying a set of sensor readings as corresponding to a potential point object, plate object or both typically will lead to the identification of many more potential objects than there are actual objects in the field of view. Using point objects merely as an example, it should be readily apparent that, in an environment with multiple objects with each sensor receiving a range reading from each object, it is easily possible for the range circle of a first sensor corresponding to the wave reflected off of a first object and the range circle of a second sensor corresponding to a wave reflected off of a different object to intersect and, thus, result in the identification of a potential object at that intersection, where no object actually exists. Such potential objects are called false objects.

Let us consider an example in which there are ten actual objects in the field of view of a sensor array comprising four sensors and that each sensor correctly receives a reading from each of the ten objects. As previously noted, it is possible for as many as $10^4 = 10,000$ potential objects to be identified. Also as previously noted, however, this is a worse case scenario. In a practical real world environment, however, several hundred potential objects are likely to be identified in the aforementioned scenario which there are really only ten actual objects in the field of view. Accordingly, any practical implementation of a trilateration technique in an environment that can contain multiple objects should include a technique for paring down the list of potential objects generated by the basic trilateration technique to a more accurate list of actual objects. Several complex mathematical algorithms are known for achieving this function. However, U.S. patent application Ser. No. 10/042,902, filed on Jan. 9, 2002 and entitled "Method and Apparatus for Determining Location of Objects Based on Range Readings from Multiple Sensors" by inventors Michael John Paradie, Andrew Evan Hunt, and John James Forde, the disclosure of which is incorporated fully herein by reference, discloses a simple and effective method for accurately paring down a list of potential objects to an accurate list of actual objects that may be used in connection with the present invention.

Figure 6:
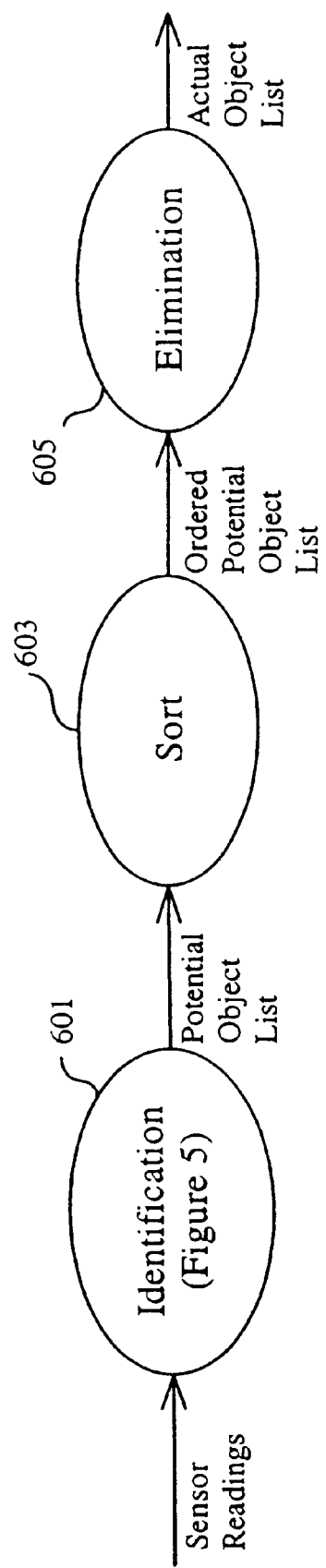
FIG. 6 is a flow diagram of a trilateration technique for creating a map of actual objects in accordance with the present invention.

FIG. 6 is a process flow diagram that illustrates that technique. In short, in step 601, a plurality of range measurements are obtained from a plurality of sensors, each sensor capable of providing a multiplicity of range measurements. The range measurements from the plurality of sensors are correlated with each other using whatever criteria is reasonable to generate a list of potential objects, including their location. Accordingly, the technique for identifying the shape and location of objects disclosed in this specification essentially corresponds to step 601 in FIG. 6 and encompasses, for instance, all of the steps of FIG. 5.

In one preferred embodiment of the invention, the list of potential objects includes a potential object for every permutation of three or four readings from different sensors (i.e., no potential objects are identified based on multiple readings from the same sensor). Accordingly, for example, if there are four sensors and each sensor detects ten objects and we will consider as potential objects all combinations of three or four sensor readings from three or four different sensors, then the total number of potential objects on the initial list will be 14,000 (i.e., $10^4+10^3+10^3+10^3+10^3=14,000$). Each of these 14,000 objects will be assumed to be either a point object or a plate object in accordance with the inventive scheme discussed above and will have a metric associated therewith. Optionally, any potential objects with a corresponding metric over a certain value can be eliminated from the list before proceeding to the next step (step 603 discussed below). This elimination process would be based on the assumption that there is some threshold for the metric over which it is virtually guaranteed that the set of sensor readings (three or four readings) do not correspond to an actual object.

In step 603, the list of potential objects is then ordered from highest to lowest likelihood of being an actual object, for example, by ordering the objects according to a calculated cumulative error of some or all of the individual sensor measurements upon which the potential object is based. The SSE metric discussed above that was used to decide whether to consider the object a point or plate object is such a value and can simply be re-used in this step to order the list of potential objects from lowest to highest metric. Of course, if the potential object was assumed to be a point object in step 601, then the metric for that potential object calculated as a point object is used. If the potential object was assumed to be a plate object in step 601, then the metric for that potential object calculated as a plate object is used.

Note that, depending upon the particular algorithm used to generate the metric and/or the particular algorithm used to identify potential objects, it may be necessary to normalize the metrics to each other. For instance, in a preferred embodiment of the invention as noted above, potential objects may be based on either three sensor readings or four sensors readings. Thus, it may be possible that metrics being compared to each other are based on measurements from a different number of sensors. If so, the metrics should be normalized to each other, for instance, by dividing each metric by the number of sensor readings that were used to calculate it.

In step 605, the ordered list is then pared down to a smaller list of actual objects by selecting the potential object highest on the ordered list and assuming that it is an actual object, and then removing from the list all other lower-ordered potential objects that are based on any of the individual measurements upon which the selected object was based. The process is then repeated for the next highest potential object remaining on the list until all potential objects on the list have either been selected as an actual object or removed from the list.

It should be apparent that, even if one omitted the optional step mentioned above in connection with step 601 of eliminating from the list of potential objects those potential objects with metrics above a certain threshold, those potential objects would likely be eliminated in step 605, in any event. Nevertheless, it is desirable to eliminate from the list at an early stage any potential objects with extremely poor metrics.

The process depicted in FIG. 6 corresponds generally to the processes that would be performed by processor 309 of FIG. 3 to generate still maps of objects in the field of view of the sensor array. In the exemplary stop & go vehicle control system represented in FIG. 3, those maps would then be fed to processor 311 to generate tracks of the objects and those tracks would be processed by processor 312 to control the vehicle, as discussed in connection with FIG. 3.

While the invention has heretofore been described primarily in connection in a two dimensional application, this is merely a matter of implementation. The invention is readily applicable to three dimensional environments. Also, as previously noted, if one is willing to increase the minimum number of sensors necessary to obtain sufficient information to predict the size shape and location of objects, then the invention can be applied using the broader assumption that objects are circles (rather than plates or points). In such an embodiment, a minimum of three range readings (that could collectively define a single circle) would be necessary to define a potential object (i.e., the location and radius of the circle object) that makes it onto the list. There would be no need to calculate an error metric for purposes of generating the list of potential objects. However, the error metric would still need to be calculated if one wished to pare down the list of potential objects to a list of actual objects in accordance with the technique of aforementioned U.S. patent application No.

Even further, if a particular application required an even more accurate depiction of the objects, then the present invention could be applied using the less restrictive assumption that all objects are ellipses. The definition of an ellipse is all points in a plane such that the sum of the distances (the sum of the distances is herein termed the length of the ellipse) from each point to two other fixed points (each of these two points is called a focus of the ellipse) is a constant. A circle is an ellipse in which the two foci are coincident. Then, with a minimum of four sensor range readings per potential object, one could define each potential object as an ellipse of a given location size and shape (including defining plate objects as ellipses of infinite length and point objects as ellipses of zero length).

To compensate for making these less restrictive assumptions and/or expanding the application of the present invention to three dimensional spaces, the number of sensors in the sensor array can be increased in order to reduce the chances of there being too few sensor readings to detect an actual object because of the failure of one or more sensors in detecting a reflection from an object.

Also, while the invention has been described in connection with the possible assumptions that all objects are circles, ellipses or circles of a finite number of possible radii (e.g., infinite or infinitesimal), these are merely exemplary. While these assumptions are particularly suitable for the stop & go vehicle control environment used as an example in this specification, making different shape assumptions may be more suitable in other environments. Broadly, the invention assumes that objects have two or more shapes and then calculates an error metric for each shape and then selects the shape that yields the best metric.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of determining the approximate shapes, sizes and locations of one or more objects based on range measurements of a plurality of range sensors, said method comprising the steps of:
   (1) obtaining from said sensors a plurality of range measurements;
   (2) correlating said range measurements of said plurality of sensors to generate a list of potential objects, each of said objects being based on a plurality of range measurements;
   (3) for each potential object on said list, calculating a plurality of locations of said object assuming said object has a plurality of predefined shapes, wherein each of said calculated locations of said plurality of locations corresponds to one of the predefined shapes of said plurality of predefined shapes;
   (4) for each potential object, calculating an error metric for each of said calculated locations, said error metrics indicative of a difference between said corresponding calculated location of said object and said range measurements upon which said object is based; and
   (5) for each potential object on said list, determining that said potential object has the shape corresponding to the lowest error calculated in step (4).

2. The method of claim 1 wherein said plurality of shapes comprise a first ellipse and a second ellipse.

3. The method of claim 2 wherein said plurality of shapes comprise a first circle having a first radius and a second circle having a second radius.

4. The method of claim 3 wherein said first radius is infinite and said second radius is zero.

5. The method of claim 1 further comprising the steps of:
   (6) ordering said list of potential objects from highest to lowest likelihood of being an actual object;
   (7) selecting a potential object highest on said ordered list as an actual object;
   (8) determining the range measurements upon which said object selected in step (7) is based;
   (9) removing from said ordered list said potential object selected in step (7) as well as any potential objects ordered lower than said potential object selected in step (7) that are based on any of said range measurements upon which said potential object selected in step (7) is based; and
   (10) repeating steps (7)–(9) until all potential objects have been removed from said list.

6. The method of claim 1 wherein step (2) comprises applying criteria for correlating a plurality of said range measurements into a set corresponding to an object that are designed to include in said list objects that qualify for inclusion based on only one of said radii assumptions as well as objects that qualify for inclusion based on both radii assumptions.

7. The method of claim 6 wherein each said range measurement upon which a potential object is based are from different sensors.

8. The method of claim 7 wherein said potential objects are based upon at least three range measurements.

9. The method of claim 8 wherein said calculation of each error metric in step (4) comprises the steps of:
   (4.1) for at least one of said range measurements upon which a potential object is based, determining a difference between said at least one range measurement and a range of said sensor that generated said at least one range measurement to said determined location of said potential object;
   (4.2) squaring each of said errors; and
   (4.3) summing said squared errors.

10. The method of claim 9 wherein step (3) comprises using said range measurements of only the two sensors most distant from each other to generate said locations.

11. The method of claim 10 wherein step (4.1) comprises determining said difference only for said range measurements upon which said potential object is based other than said two sensors most distant from each other.

12. A method of determining the approximate shapes, sizes and locations of one or more objects based on range measurements of a plurality of range sensors, said method comprising the steps of:
   (1) obtaining from said sensors a plurality of range measurements; and
   (2) correlating said range measurements of said plurality of sensors using trilateration and assuming that all objects are ellipses to generate a list of objects, each of said objects being based on a plurality of range measurements.

13. The method of claim 12 wherein step (2) is performed assuming that all objects are circles.

14. The method of claim 13 further comprising the steps of:
   (3) ordering said list of objects from highest to lowest likelihood of being an actual object;
   (4) selecting an object highest on said ordered list as an actual object;
   (5) determining the range measurements upon which said object selected in step (4) is based;
   (6) removing from said ordered list said object selected in step (4) as well as any potential objects ordered lower than said potential object selected in step (4) that are based on any of said range measurements upon which said potential object selected in step (4) is based; and
   (7) repeating steps (4)–(6) until all potential objects have been removed from said list.

15. A method of determining the approximate shapes, sizes and locations of one or more objects based on range measurements from a plurality of range sensors, said method comprising the steps of:

(1) obtaining from said sensors a plurality of range measurements;

(2) correlating said range measurements of said plurality of sensors using trilateration to generate a list of objects, each of said objects being based on a set of range measurements;

(3) for each object on said list, calculating a first location of said object assuming said object is a circle of a first predefined radius;

(4) for each object on said list, calculating a second location of said object assuming said object is a circle of a second predefined radius;

(5) for each object, calculating an error metric for each of said first and second locations, said error metrics indicative of a difference between said corresponding calculated location of said object and said range measurements upon which said object is based; and (6) for each object on said list, determining that said object has the radius that yielded the lowest error in step (5).

16. The method of claim 15 further comprising the steps of:

(7) ordering said list of objects from highest to lowest likelihood of being an actual object;

(8) selecting an object highest on said ordered list as an actual object;

(9) determining the range measurements upon which said object selected in step (8) is based;

(10) removing from said ordered list said object selected in step (8) as well as any potential objects ordered lower than said potential object selected in step (8) that are based on any of said range measurements upon which said potential object selected in step (8) is based; and

(11) repeating steps (8)–(10) until all potential objects have been removed from said list.

17. The method of claim 15 wherein said first radius is infinite, whereby said circle of said first radius is a plate, and wherein said second radius is zero, whereby said circle of said second radius is a point.

18. The method of claim 15 wherein step (2) comprises applying criteria for correlating a plurality of said range measurements into a set corresponding to an object that are designed to include in said list objects that qualify for inclusion based on only one of said radii assumptions as well as objects that qualify for inclusion based on both radii assumptions.

19. The method of claim 17 wherein objects on said list are based upon at least two range measurements.

20. The method of claim 19 wherein said at least two range measurements upon which each object on said list is based are range measurements from different sensors.

21. The method of claim 20 wherein objects on said list are based upon at least three range measurements.

22. The method of claim 21 wherein said plurality of sensors comprises four sensors.

23. The method of claim 21 wherein steps (3) and (4) comprise using said range measurements of only the two sensors most distant from each other to generate said locations.

24. The method of claim 23 wherein step (5.1) comprises determining said difference only for said range measurements upon which said potential object is based other than said two sensors most distant from each other.

25. The method of claim 15 wherein said method is performed assuming a two dimensional environment.

26. An apparatus for determining the locations of a plurality of actual objects based on range measurements said apparatus comprising:

a plurality of range sensors, each sensor capable of providing a multiplicity of range measurements;

a digital processor adapted to (a) obtain from said sensors a plurality of range measurements; (b) correlates said range measurements of said plurality of sensors to generate a list of potential objects, each of said objects being based on a plurality of range measurements; (c) for each potential object on said list, calculate a plurality of locations of said object assuming said object has a plurality of predefined shapes, respectively; (d) for each potential object, calculate an error metric for each of said calculated locations, said error metrics indicative of a difference between said corresponding calculated location of said object and said range measurements upon which said object is based; and (e) for each potential object on said list, determining that said potential object has the shape corresponding to the lowest error.

27. The apparatus of claim 26 wherein said plurality of shapes comprise a first circle having a first radius and a second circle having a second radius.

28. The apparatus of claim 27 wherein said first radius is infinite and said second radius is zero.

29. The apparatus of claim 26 wherein said processor is further adapted to (f) order said list of potential objects from highest to lowest likelihood of being an actual object; (g) select a potential object highest on said ordered list as an actual object; (h) determine the range measurements upon which said selected object is based; (h) remove from said ordered list said selected potential object as well as any potential objects ordered lower than said selected potential object that are based on any of said range measurements upon which said selected potential object is based; and (i) repeating processes steps (g)–(i) until all potential objects have been removed from said list.

30. The apparatus of claim 26 wherein process (b) comprises applying criteria for correlating a plurality of said range measurements into a set corresponding to an object that are designed to include in said list objects that qualify for inclusion based on only one of said shapes as well as objects that qualify for inclusion based on both of said shapes.

31. The apparatus of claim 30 wherein each said range measurement upon which a potential object is based are from different sensors.

32. The apparatus of claim 31 wherein said potential objects are based upon at least three range measurements.

33. The apparatus of claim 32 wherein said plurality of sensors comprises four sensors.

34. The apparatus of claim 33 wherein said digital processor is adapted to include in said list only potential objects that are based upon range measurements from at least three sensors.

35. The apparatus of claim 34 wherein said digital processor uses said range measurements of only the two sensors most distant from each other to generate said locations.

36. The apparatus of claim 35 wherein said digital processor calculates said cumulative error using only said range measurements upon which said potential object is based other than said two sensors most distant from each other.

37. The apparatus of claim 36 wherein said sensors are arranged in a line.

* * * * *